United States Patent
Higbie et al.

(10) Patent No.: US 10,647,410 B2
(45) Date of Patent: May 12, 2020

(54) SPINNER SHAFT ATTACHMENT

(71) Applicant: Sikorsky Aircraft Corporation, Stratford, CT (US)

(72) Inventors: Robert Higbie, Haslet, TX (US); David Littlejohn, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1069 days.

(21) Appl. No.: 15/225,234

(22) Filed: Aug. 1, 2016

(65) Prior Publication Data
US 2018/0029692 A1  Feb. 1, 2018

(51) Int. Cl.
*B64C 11/14* (2006.01)
*B64C 27/10* (2006.01)

(52) U.S. Cl.
CPC ............. *B64C 11/14* (2013.01); *B64C 27/10* (2013.01)

(58) Field of Classification Search
CPC . B64C 11/02; B64C 11/14; B64C 2027/8236; F01D 5/02
See application file for complete search history.

(56) References Cited

U.S. PATENT DOCUMENTS

| | | | |
|---|---|---|---|
| 2,353,578 A * | 7/1944 | Marshall | B64C 11/14 416/245 R |
| 8,632,307 B1 | 1/2014 | Muylaert et al. | |
| 9,366,183 B2 | 6/2016 | Patsouris et al. | |
| 2013/0164129 A1 | 6/2013 | Rauger et al. | |
| 2018/0029692 A1* | 2/2018 | Higbie | B64C 11/14 |

* cited by examiner

*Primary Examiner* — Woody A Lee, Jr.
*Assistant Examiner* — Christopher R Legendre
(74) *Attorney, Agent, or Firm* — Cantor Colburn LLP

(57) ABSTRACT

A spinner assembly includes a cone-shaped member having a plurality of blade openings. The cone-shaped member is receivable about a shaft at a first location. A bulkhead frame is connected to the cone-shaped member. At least one strut is configured to couple the bulkhead frame to the shaft at a second location. The at least one strut includes at least one arm having a longitudinal rigid member and at least one flexure region that defines an axis about which the at least one arm bends.

17 Claims, 4 Drawing Sheets

SPINNER SHAFT ATTACHMENT

STATEMENT REGARDING FEDERALLY SPONSORED RESEARCH OR DEVELOPMENT

This invention was made with Government support under Agreement No. W911W6-13-2-0003 for the Joint Multi-Role Technology Demonstrator Phase I-Air Vehicle Development program. The Government has certain rights in the invention.

BACKGROUND OF THE INVENTION

Exemplary embodiments of the invention relate to a propeller spinner for use in an aircraft propulsion system, and more particularly, to the connection between spinner and the shaft adjacent shaft of the propulsion system.

Propeller systems, such as commonly used on fixed wing and rotary wing aircrafts includes a spinner mounted at the center of the propeller. The spinner is an aerodynamic fairing commonly used to provide a smooth aerodynamic contour and reduce drag by covering the hub and a pitch changing mechanism incorporated into the propeller. The spinner typically attaches to the propeller shaft at either one or two locations, forward and aft of the rotor plane. In instances where the spinner is connected at two points, relative twist may occur between the two spinner attachment locations along the propeller shaft. Mounting structures may transmit this torque to the spinner causing the spinner or the mounting structure for attaching the spinner to the propeller shaft to fail.

BRIEF DESCRIPTION OF THE INVENTION

According to one embodiment of the invention, a spinner assembly includes a cone-shaped member having a plurality of blade openings. The cone-shaped member is receivable about a shaft at a first location. A bulkhead frame is connected to the cone-shaped member. At least one strut is configured to couple the bulkhead frame to the shaft at a second location. The at least one strut includes at least one arm having a longitudinal rigid member and at least one flexure region that defines an axis about which the at least one arm bends.

In addition to one or more of the features described above, or as an alternative, in further embodiments the at least one flexure region includes a first flexure region formed adjacent a first end of the at least one arm and a second flexure region formed adjacent a second end of the at least one arm.

In addition to one or more of the features described above, or as an alternative, in further embodiments comprising a first flange arranged at a first end of the at least one arm for mounting the at least one arm to the shaft. A second flange is arranged at a second, opposite end of the at least one arm for mounting the arm to the spinner assembly.

In addition to one or more of the features described above, or as an alternative, in further embodiments the at least one arm includes a first arm and a second arm.

In addition to one or more of the features described above, or as an alternative, in further embodiments both the first arm and the second arm each include at least one flexure region.

In addition to one or more of the features described above, or as an alternative, in further embodiments the first arm and the second arm are integrally formed.

In addition to one or more of the features described above, or as an alternative, in further embodiments the first arm and the second arm are coupled together.

In addition to one or more of the features described above, or as an alternative, in further embodiments the first arm is arranged at an angle relative to the second arm.

According to another embodiment, a propeller assembly includes a propeller shaft and a propeller hub. The propeller shaft is configured to drive rotation of the propeller hub about an axis. A plurality of propeller blades is mounted to and extends outwardly from the propeller hub. A spinner assembly includes a cone-shaped member having a plurality of blade openings. The cone-shaped member is coupled to the propeller shaft at a first connection adjacent a first side of the propeller hub. A bulkhead frame is connected to the cone-shaped member. At least one strut is configured to couple the bulkhead frame to the propeller shaft at a second connection adjacent a second, opposite side of the propeller hub. The at least one strut comprises at least one arm having a longitudinal rigid member and at least one flexure region that defines an axis about which the at least one arm may flex.

In addition to one or more of the features described above, or as an alternative, in further embodiments the at least one strut includes a plurality of struts, the plurality of struts being spaced equidistantly about the propeller shaft and the bulkhead frame.

In addition to one or more of the features described above, or as an alternative, in further embodiments the at least one strut includes a plurality of struts, the plurality of struts being substantially identical.

In addition to one or more of the features described above, or as an alternative, in further embodiments the first connection is upstream from the second connection relative to an air flow.

In addition to one or more of the features described above, or as an alternative, in further embodiments the first connection is downstream from the second connection relative to an air flow.

In addition to one or more of the features described above, or as an alternative, in further embodiments the first connection and the second connection cooperate to transmit lateral and axial loads to the propeller shaft.

In addition to one or more of the features described above, or as an alternative, in further embodiments the first connection and the second connection cooperate to transmit lateral and axial loads to the propeller shaft.

In addition to one or more of the features described above, or as an alternative, in further embodiments one of the first connection and the second connection transmits torsional loads to the propeller shaft and the other of the first connection and the second connection relieves the torsional loads at the propeller shaft while carrying axial loads.

In addition to one or more of the features described above, or as an alternative, in further embodiments the propeller assembly is part of an aircraft.

In addition to one or more of the features described above, or as an alternative, in further embodiments the propeller assembly is part of a translational thrust system.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
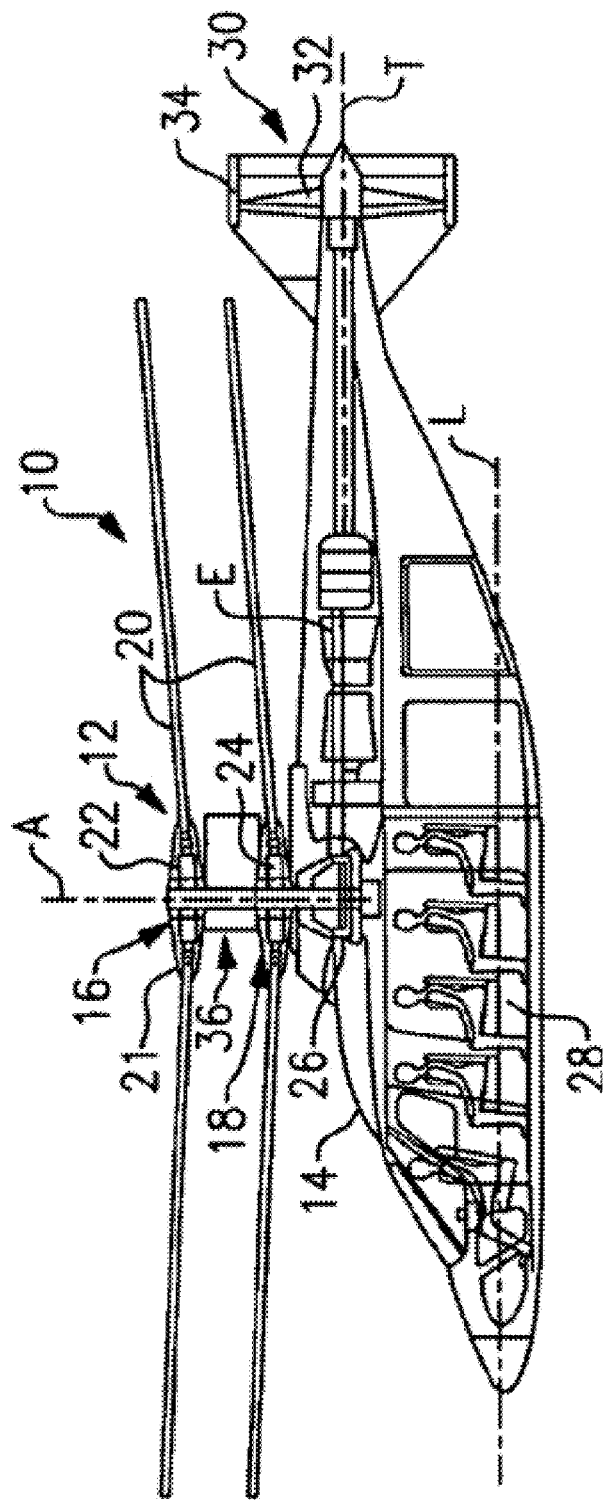
FIG. 1 is a side view of an example of a rotary wing aircraft.

FIG. 1 illustrates and example of a vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in the disclosed embodiment, other translational thrust systems will also benefit from the present disclosure.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24 and are connected thereto in any manner known to one of ordinary skill in the art (schematically illustrated at 21). Any number of blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). As shown, the gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. Preferably, the translational thrust system 30 includes a pusher propeller 32.

Figure 2:
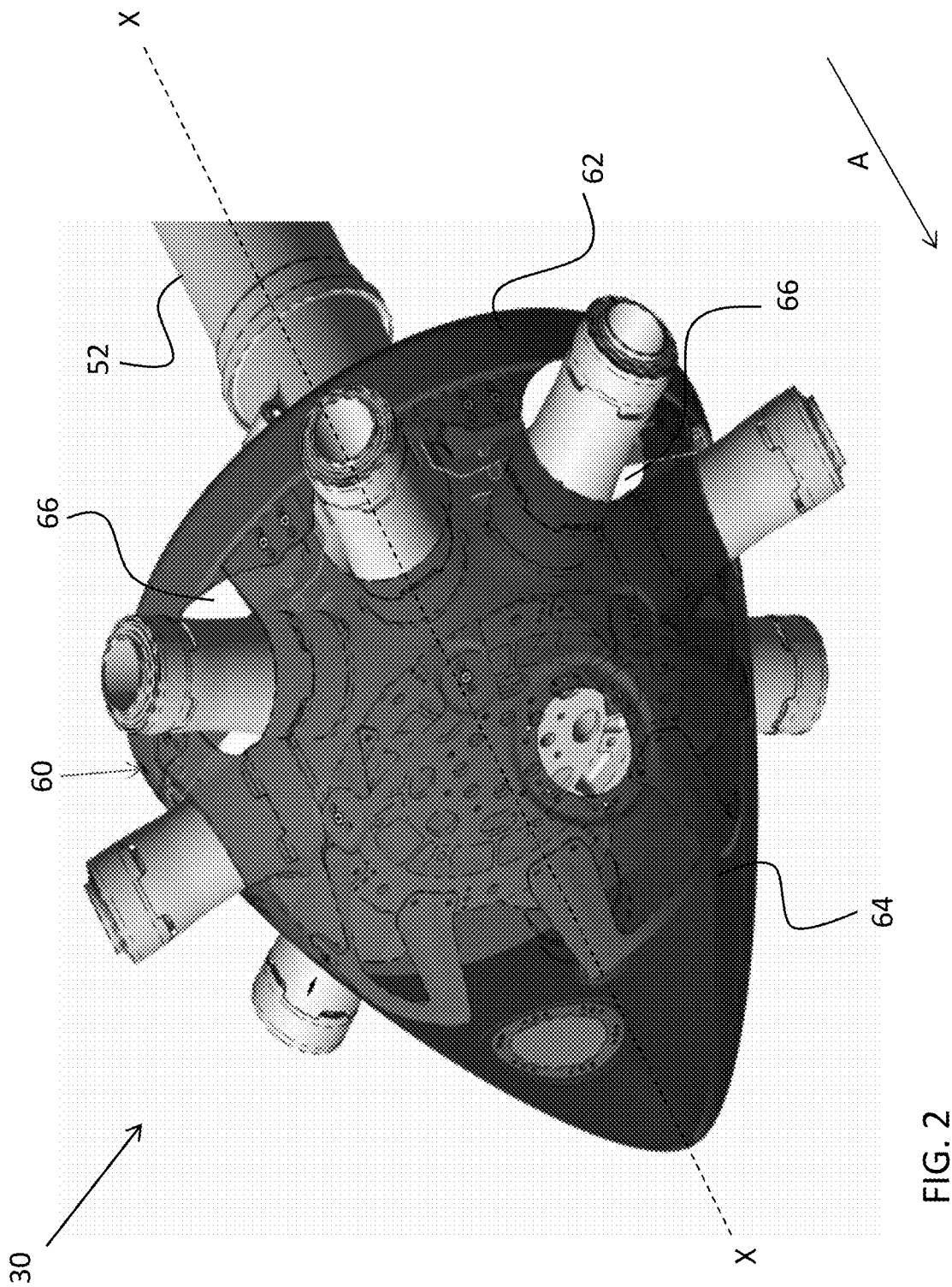
FIG. 2 is a front perspective view of a spinner assembly of a propeller according to an embodiment.
Figure 3:
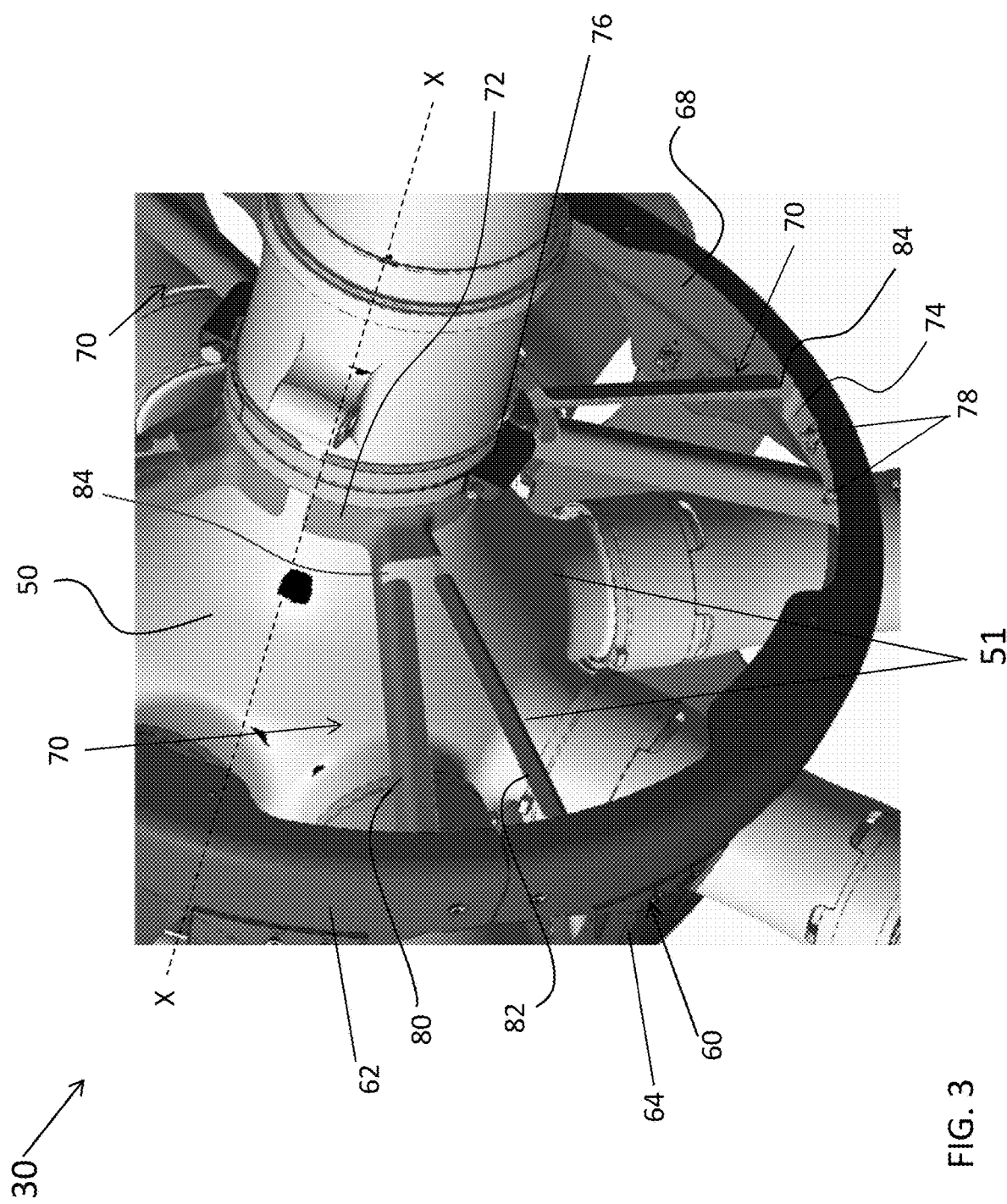
FIG. 3 is a rear perspective side view of a spinner assembly of a propeller according to an embodiment.
Figure 4:
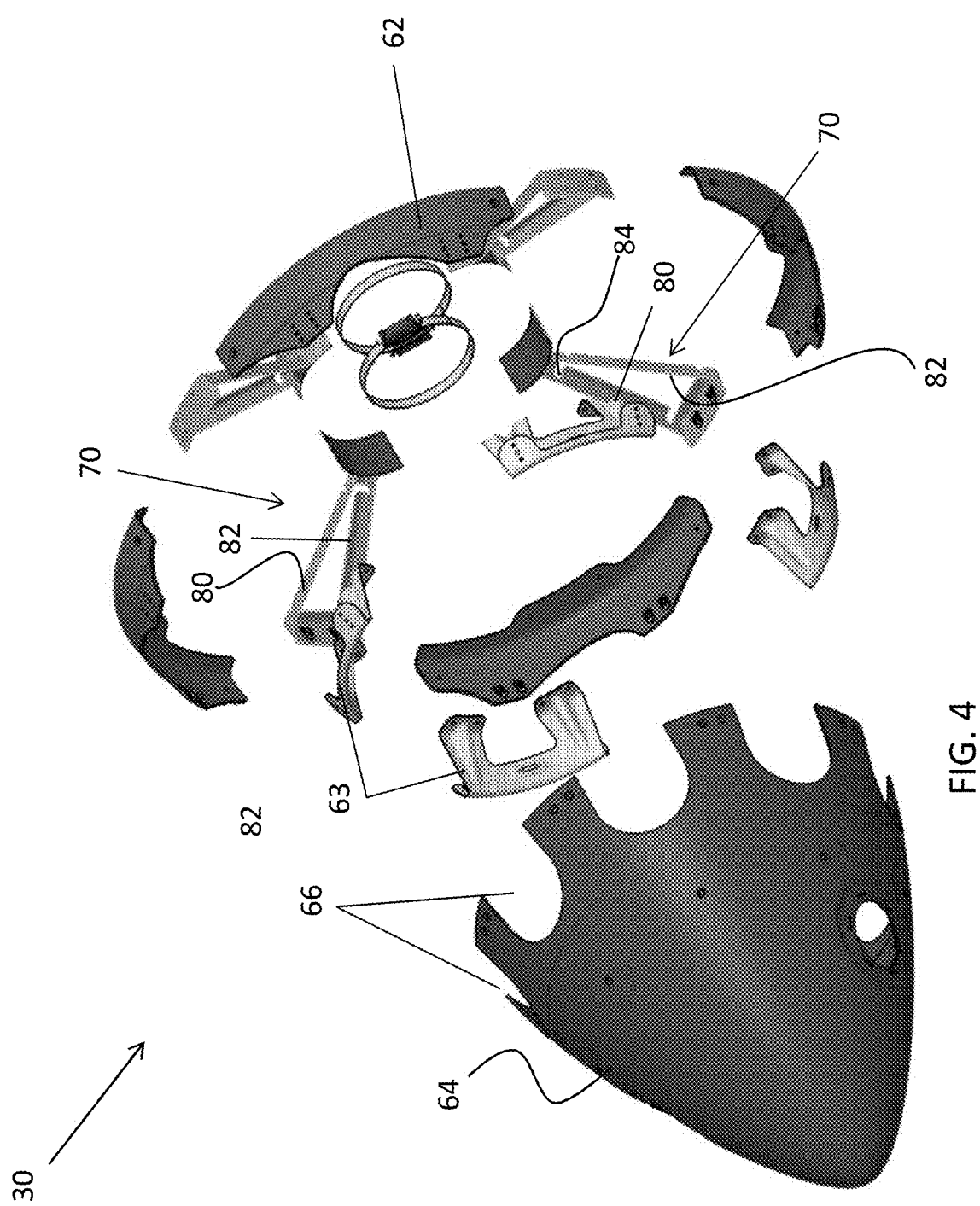
FIG. 4 is an exploded perspective view of a spinner assembly according to an embodiment.

With further reference to the FIGS. 2-4, a perspective view of a portion of the translational thrust system 30 is illustrated in more detail. The translational thrust system 30 includes a propeller hub 50 (best shown in FIG. 3) mounted to a shaft 52 such that the shaft 52 drives rotation of the propeller hub 50 about an axis of rotation X. Two or more propeller blades 32 (FIG. 1) are mounted to and extend outwardly from the propeller hub 50. The propeller hub 50 mechanically secures each of the plurality of propeller blades 32 to the propeller shaft 52. A spinner assembly 60 encloses the propeller hub 50 and provides an aerodynamic surface around the hub 50. Although the spinner assembly 60 is illustrated and described herein with respect to a translational thrust system 30, such as a propulsor of an aircraft, it should be understood that the spinner assembly 60 and the attachment means disclosed herein may be used in any suitable application, such as in fixed wing applications and/or tilt wing applications.

The spinner assembly 60 includes a generally circular bulkhead frame 62 arranged generally concentrically with the shaft 52, and a cone-shaped member 64 mounted at a distal end to the bulkhead frame 62 in overlapping arrangement with the propeller hub 50. The cone-shaped member 64 is an aerodynamic fairing or shroud having a plurality of blade openings 66 formed therein such that the cone-shaped member 64 may be installed about an assembled propeller hub 50 and blade assembly 32. The cone-shaped member 64 has a generally curved outer surface configured to provide a smooth, non-turbulent flow of air or another fluid around each propeller blade 32, thereby reducing the drag acting on the translational thrust system 30.

The spinner assembly 60 is connected to the rotating shaft 52 at a first location, adjacent a first side of the propeller hub 50, and at a second location, adjacent a second opposite side of the propeller hub 50. In the illustrated, non-limiting embodiment, the first location is arranged upstream from the propeller hub 50 and is connected to the shaft 52, and the second location is arranged downstream from the propeller hub 50 and is connected to the hub 50, with respect to the air flow. Although the direction of the air flow is indicated in the illustrated, non-limiting embodiment by arrow A, embodiments where the air flow is arranged in an opposite direction are also contemplated herein.

Both connections between the spinner assembly 60 and the shaft 52 work together to transmit lateral and axial loads to the shaft 52, as well as to couple out any moments caused by uneven external or inertial loads. In an embodiment, one of the connections is configured to transmit torsional loads to the shaft 52 connected using U shaped connectors 63 (see FIG. 4) while the other connection is configured to relieve said torsional loads at the shaft 52 while carrying axial loads. As such, there are connections both upstream and downstream of the spokes 51 extending from the hub 50 for connection to the blades 32, thereby providing axial stability to the spinner 60.

The upstream connection between the spinner assembly 60 and the shaft 52 is illustrated in more detail in FIG. 3. As shown, a plurality of struts 70 extends between an inner surface 68 of the bulkhead frame 62 and the propeller shaft 52. Although the struts 70 are illustrated as being spaced generally equidistantly about the periphery of the propeller shaft 52, embodiments where the struts 70 are arranged non-uniformly at various locations about the propeller shaft 52 are also considered within the scope of the disclosure. Further, the plurality of struts 70 may be substantially identical or may be different.

Each strut 70 includes a first flange 72 arranged at a first end thereof, and a second flange 74 arranged at a second, opposite end thereof. The first flange 72 and the second flange 74 extend substantially perpendicular to the strut 70, parallel to the rotational axis X of the shaft 52. The first flange 72 is configured with a curved surface complementary to the exterior surface of the propeller shaft 52 and the second flange 72 is configured with a curved surface generally complementary to the curved interior surface 68 of the bulkhead frame 62. In the illustrated, non-limiting embodiment, the plurality of first flanges 72 are retained in contact with the propeller shaft 52 via a tightening or cinching mechanism 76 arranged in overlapping arrangement with the plurality of first flanges 72. The plurality of second flanges 74 may be coupled to the bulkhead 62 via one or more attachments members 78, such as fasteners for example.

However, it should be understood that any mechanism for mounting the first and second flanges 72, 74 to the propeller shaft 52 and the bulkhead frame 62, respectively are contemplated herein. The connections formed between the first flanges 72 and the propeller shaft 52 and between the second flanges 74 and the bulkhead 62 are rigid attachment points.

Each strut 70 may comprise a single arm or a plurality of arms extending between the propeller shaft 52 and the bulkhead 62. The one or more arms of the strut 40 are generally formed from a longitudinally rigid member. In the illustrated, non-limiting embodiment, each strut 70 includes a first arm 80 and a second arm 82. The first arm 80 and the second arm 82 may be connected to one another, or alternatively, may be integrally formed such as at the first and second flanges 72, 74 for example. The first arm 80 and the second arm 82 may be substantially identical, or may vary in at least one of size and shape. The first arm 80 and the second arm 82 may be arranged substantially parallel to one another, or may be arranged at an angle, as shown in the FIG.

Each of the plurality of struts 70 is configured to provide the necessary radial and axial rigidity between the shaft 52 and the bulkhead frame 62, while allowing for some torsional flex there between as the shaft 52 spins about rotational axis X. To provide the flexure necessary, one or more flexure regions 84 may be formed in each arm. The flexure region 84 may be formed by weakening the rigidity of each arm 80, 82 by forming a cut out or notch in the material at a desired location. As a result, the arm 80, 82 may be able to flex about one or more axes defined by the shape of the absent material. For example, in the illustrated, non-limiting embodiment, a first flexure region 84 is formed in both the first arm 80 and the second arm 82 adjacent the first flange 72, and a second flexure region 84 is formed in both the first arm 80 and the second arm 82 adjacent the second flange 74. In such embodiments, each of the struts 70 may be substantially symmetrical about a longitudinal axis or plane extending between the first arm 80 and the second arm 82 and containing the rotational axis X of the propeller shaft 52.

The size and location of the one or more flexure regions 84 formed in each strut may be optimized to provide the necessary flexure based on an application. It should therefore be understood that embodiments where the struts 70 have flexure regions of another configuration are also within the scope of the disclosure.

By using the struts 70 described herein to connect the spinner assembly 60 to the propeller shaft 52 adjacent the propeller hub 50, wind up or torque in the shaft 52 may be relieved without being transmitted to the spinner assembly. Instead, the two connection points between the spinner assembly 60 and the shaft 52 allow moments caused by uneven external or inertial loads to be coupled out. The struts 70 therefore provide a weight-efficient solution configured with the axial and radial rigidity necessary for operation of the spinner.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while described in terms of aircraft, it is understood that aspects of the invention can be used in non-aircraft solutions, including Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A spinner assembly comprising:
   a cone-shaped member having a plurality of blade openings, the cone-shaped member being receivable about a shaft at a first location;
   a bulkhead frame connected to the cone-shaped member; and
   at least one strut configured to couple the bulkhead frame to the shaft at a second location, the at least one strut including at least one arm having a longitudinal rigid member and at least one flexure region that defines an axis about which the at least one arm bends, wherein the at least one flexure region includes a first flexure region formed adjacent a first end of the at least one arm and a second flexure region formed adjacent a second end of the at least one arm.

2. The spinner assembly according to claim 1, further comprising:
   a first flange arranged at a first end of the at least one arm for mounting the at least one arm to the shaft; and
   a second flange arranged at a second end, opposite to the first end, of the at least one arm for mounting the at least one arm to the spinner assembly.

3. The spinner assembly according to claim 1, wherein the at least one arm includes a first arm and a second arm.

4. The spinner assembly according to claim 3, wherein the first arm and the second arm are integrally formed.

5. The spinner assembly according to claim 3, wherein the first arm and the second arm are coupled together.

6. The spinner assembly according to claim 3, wherein the first arm is arranged at an angle relative to the second arm.

7. A propeller assembly comprising:
   a propeller shaft;
   a propeller hub, the propeller shaft being configured to drive rotation of the propeller hub about an axis;
   a plurality of propeller blades mounted to and extending outwardly from the propeller hub; and
   a spinner assembly including:
      a cone-shaped member having a plurality of blade openings, the cone-shaped member being coupled to the propeller shaft at a first connection adjacent a first side of the propeller hub;
      a bulkhead frame connected to the cone-shaped member; and
      at least one strut configured to couple the bulkhead frame to the propeller shaft at a second connection adjacent a second side, opposite to the first side, of the propeller hub, the at least one strut comprising at least one arm having a longitudinal rigid member and at least one flexure region that defines an axis about which the at least one arm may flex, wherein the at least one flexure region includes a first flexure region formed adjacent a first end of the at least one arm and a second flexure region formed adjacent a second end of the at least one arm.

8. The propeller assembly according to claim 7, wherein the at least one strut includes a plurality of struts, the plurality of struts being spaced equidistantly about the propeller shaft and the bulkhead frame.

9. The propeller assembly according to claim 7, wherein the first connection is upstream from the second connection relative to an air flow.

10. The propeller assembly according to claim 7, wherein the first connection is downstream from the second connection relative to an air flow.

11. The propeller assembly according to claim 7, wherein the first connection and the second connection cooperate to transmit lateral and axial loads to the propeller shaft.

12. The propeller assembly according to claim 7, wherein one of the first connection and the second connection transmits torsional loads to the propeller shaft and the other of the first connection and the second connection relieves the torsional loads at the propeller shaft while carrying axial loads.

13. The propeller assembly according to claim 7, wherein the propeller assembly is part of an aircraft.

14. The propeller assembly according to claim 13, wherein the propeller assembly is part of a translational thrust system.

15. A spinner assembly comprising:
a cone-shaped member having a plurality of blade openings, the cone-shaped member being receivable about a shaft at a first location;
a bulkhead frame connected to the cone-shaped member; and
at least one strut configured to couple the bulkhead frame to the shaft at a second location, the at least one strut including at least one arm having a longitudinal rigid member and at least one flexure region that defines an axis about which the at least one arm bends, wherein the at least one arm includes a first arm and a second arm.

16. The spinner assembly according to claim 15, wherein both the first arm and the second arm each include at least one flexure region.

17. The spinner assembly according to claim 15, wherein the first arm is arranged at an angle relative to the second arm.

* * * * *